United States Patent [19]

Gallo et al.

[11] 4,232,710

[45] Nov. 11, 1980

[54] LIQUID PIPELINE EXTENDED VANE ELBOW

[75] Inventors: Donald J. Gallo, Whippany; Thomas L. Roscetti, Rockaway; Alan E. Emslie, Mountainside, all of N.J.; Frederick G. Hammitt, Ann Arbor, Mich.

[73] Assignee: Exxon Research & Engineering Co., Florham Park, N.J.

[21] Appl. No.: 8,874

[22] Filed: Feb. 2, 1979

[51] Int. Cl.³ ............................................. F15D 1/04
[52] U.S. Cl. ....................................... 138/39; 138/37; 137/615
[58] Field of Search ............................ 138/37, 39, 115; 285/276, 131; 137/615, 274; 239/590.5

[56] References Cited

U.S. PATENT DOCUMENTS

| 704,238 | 7/1902 | Cooksey | 138/37 X |
|---|---|---|---|
| 1,046,399 | 12/1912 | Mueller et al. | 138/37 |
| 1,467,168 | 9/1923 | Kaplan | 138/37 |
| 1,671,898 | 5/1928 | Gingerich | 138/37 X |
| 1,827,727 | 10/1931 | Blizzard | 138/37 |
| 1,866,930 | 7/1932 | Guidetti et al. | 137/615 X |
| 2,684,690 | 7/1954 | Lee | 239/590.5 X |
| 3,398,765 | 8/1968 | Oshima et al. | 138/39 |
| 3,708,126 | 1/1973 | DeKinkelder | 239/590.5 |
| 3,724,499 | 4/1973 | Huniu | 138/39 X |
| 4,058,141 | 11/1977 | Hasinger et al. | 138/39 |

Primary Examiner—James E. Bryant, III
Attorney, Agent, or Firm—F. Donald Paris

[57] ABSTRACT

A system for suppressing cavitation in fluid pipeline passages such as fluid loading arms, particularly of the marine type, comprising extended turning vanes in the elbows of the loading arm, preferably in the upstream direction from the elbow tangent point, and also including the capability for adjusting the attack angle of the vane relative to the pipe axis. The combined effect of the extended vane and the negative attack angle improves cavitation performance to a greater extent than each of these expedients when used separately. This system obtains increased flow rates without significantly increasing the system back pressure and the adjustability of the attack angle will allow for optimization relative to changes in products and flow conditions.

10 Claims, 9 Drawing Figures

LIQUID PIPELINE EXTENDED VANE ELBOW

BACKGROUND OF THE INVENTION

The present invention relates generally to fluid pipeline passages and more particularly to an improved fluid loading arm which suppresses harmful cavitation without significant increase in system back pressure.

At the present time, it is well known that flow velocities in loading arms, and particularly in marine fluid loading arms, are restricted by the phenomenon of "cavitation." This occurs in the loading arm short radius elbows. Thus, as a fluid flows through an elbow there are pressure gradients which occur across the elbow cross-section and the pressure is lowest at the inner or shortest radius. As the velocity of the flow increases, the pressure at the inner radius will decrease until the vapor pressure of the fluid has substantially been reached. At this particular point in time a plurality of relatively small bubbles or cavities of the product vapor will be formed and begin to flow downstream and when the bubbles reach a region of relatively higher pressure, the bubbles will implode, in other words collapse, with a violent release of energy. These implosions can cause erosion of the pipewall and vibration in the arm, which can then result in arm failure because of structural weakening, fatigue failure from the dynamic stresses produced, or as a minimum, costly replacement of eroded arm components.

Generally, it is economically desirable and there exists significant incentive to increase the flow velocity through the arm. The advantages of increased flow are a shorter turnaround time at an existing or new berth, and avoiding the need to replace existing arms with larger diameter arms, as well as in the case of new terminals smaller and/or fewer arms can be used. This results in a reduction of capital investment. However, when these flow velocities are increased this can cause a corresponding increase in damage to the arm because of the low pressure zones created at the inner radius of the elbows. Thus, while increased flow velocity is desirable, the corresponding problem of cavitation created thereby is a primary concern.

The primary parameters which determine when cavitation will occur include the flow variables of absolute pressure, $P_o$, and velocity, $V_o$, the boundary geometry and the vapor pressure, $P_v$, and density, $\rho$, of the liquid. The relationship between these parameters is generally known as the cavitation number, sigma, which equals $$(P_o - P_v)/(\tfrac{1}{2}\rho V_o^2)$$

Thus, if one could increase the flow velocity, the foregoing and other advantages will be obtained by not without the attendant disadvantages, unless means are introduced to suppress cavitation.

The systems and arrangements currently used in the elbows for suppression of cavitation and improving flow rate comprise turning vanes in the arm elbows. These vanes split the single flow stream into a multiplicity of streams, each of which has smaller pressure gradients than the overall pressure gradient of the single flowing stream. This permits a higher pressure rating to be achieved with a vaned elbow before the vapor pressure of the fluid is reached and without producing cavitation. This arrangement is generally known in the art as typified by the disclosures of U.S. Pat. Nos. 1,837,901; 1,996,596; 2,662,553; 2,723,680; 2,733,044; 3,597,166. A patent of particular interest is U.S. Pat. No. 3,724,499 wherein there is disclosed a loading arm having shaped turning vanes in the elbows in combination with a Venturi section at the outlet of the loading arm for raising the fluid pressure in the arm. The concept of increasing arm fluid pressure is well-known in the industry. As previously discussed, it will permit higher flow velocity to be achieved before cavitation occurs. Thus, in the prior art patented loading arm design it is necessary to have increased back pressure to cause the improved flow rate. The same effect can be obtained as well by employing a valve at the outlet pipe for restricting flow. However, a disadvantage of that type of system would be the additional pump capacity which is required in order to overcome the additional back pressure due either to the Venturi or the valve. Other prior art patents of general interest are U.S. Pat. No. 2,564,683 which discloses adjustable plates in a flow passage and U.S. Pat. No. 3,398,765 discloses an elbow-located guide plate for minimizing the effect of the bend on flow. Thus, it is apparent that there is a need for a system which will permit higher flow rate through the fluid loading arm without cavitation and without a significant increase in the back pressure.

SUMMARY OF THE INVENTION

The present invention comprises a system which overcomes the disadvantages of the prior art systems and basically comprises a coaction between an extended vane upstream of the elbow tangent point and a negative attack angle for the vane. It is generally applicable to fluid pipeline passages having elbows and particularly useful in loading arms of the marine type. The edge of the vane facing the flow also is shaped to provide a relatively clean aerodynamic shape. The extended vane is supported on its sides in order to prevent any fluttering of the leading edge in those cases where the elbow is adjacent a straight pipe or if in a nipple portion of the swivel then the side edges can be welded to the pipe swivel. In those cases where the elbow is adjacent a swivel body and close to the swivel nipple, a rotatable ring support can be provided. This ring can be recessed in a groove disposed in the swivel nipple portion. The sides of the extended vane are welded to the ring in order to eliminate any fluttering problems as well as to maintain the vane in a relatively constant attack angle relative to the fluid flow. By providing for adjustability of the attack angle of the extended vane, this permits optimization of the combined extended vane and attack angle to produce the most desirable flow rate without incurring cavitation. A suitable vane adjustment means which can be employed is a manually operated screw which activates a rod bearing against the vane to cause the vane to adjust its attack angle, or alternatively, a solenoid or hydraulically-operated piston motor for remote control of the adjustability feature particularly in inaccessible locations may also be employed. The advantages which would result from vaned elbows according to the present invention are basically higher arm flow rates without the attendant cavitation and/or higher system pressure levels of the prior art systems, which means less investment required in the loading arms for a new grass roots project, since smaller or fewer larger arms can be supplied to obtain desired low capacity; at existing facilities increased throughput can be realized without the addition of more arms or without replacing existing arms with the same number of larger arms; and lower tanker demurrage costs can be realized because shorter pumping times will result in less time in the berth.

DESCRIPTION OF THE PREFERRED EMBODIMENT

Figure 1:
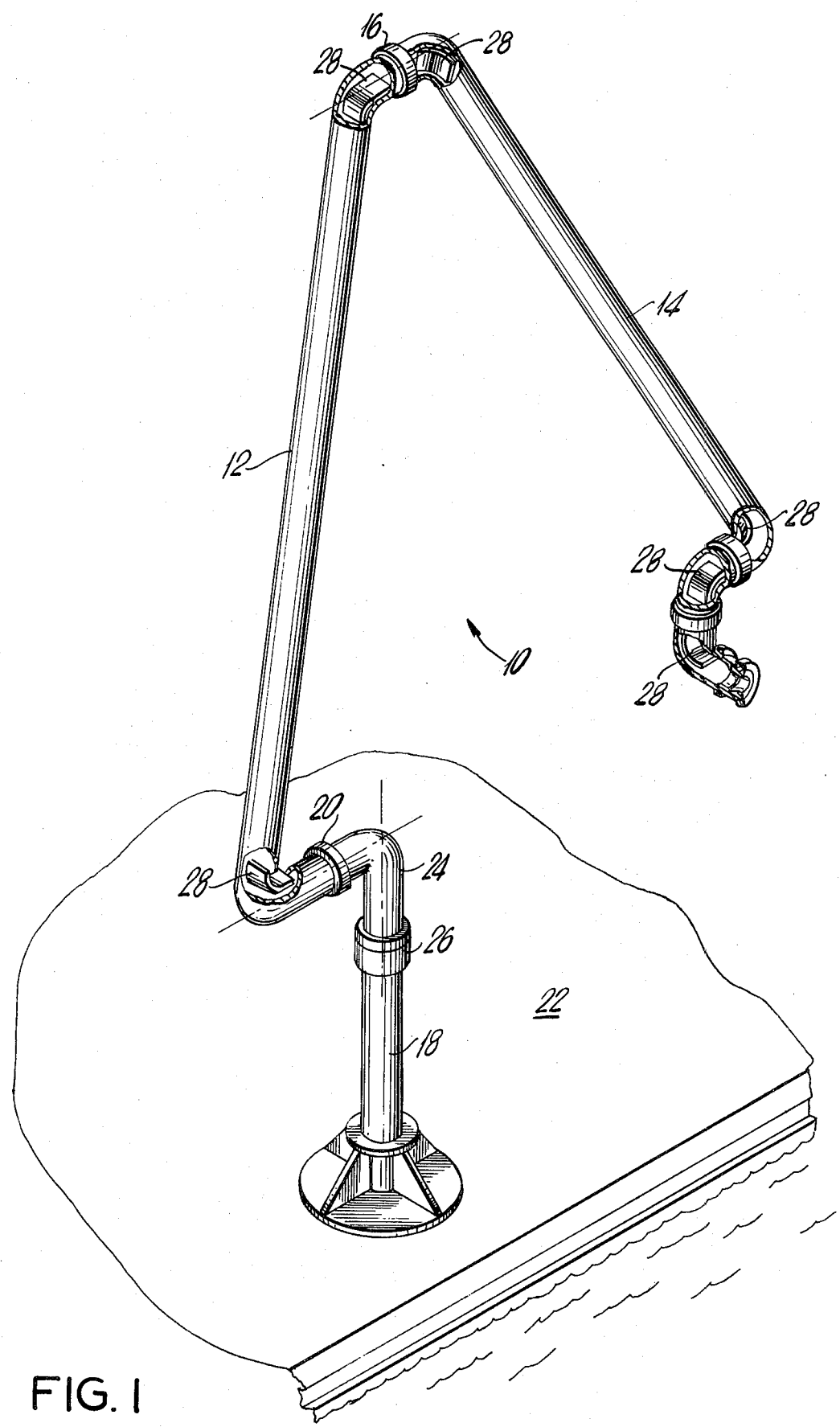
FIG. 1 is a perspective view, partially broken away, of a fluid loading arm employing the present invention.

A typical embodiment of the present invention is in a fluid loading arm environment, particularly for use, for example, in the transfer of petroleum or other liquid products between a tanker and shore based storage facility as illustrated in FIG. 1. Other uses of the invention are in pipeline passages which contain an elbow. There is shown a marine loading arm 10 comprising a plurality of straight sections of pipe joined by fluid swivels and pipe elbows. The arm comprises an inboard pipe section 12, and an outboard pipe section 14, pivotally connected through swivel joint 16 to the inboard section, an upstanding riser section 18 to which the inner section is pivotally connected by a further swivel joint 20, and a triple swivel assembly connected to the end of the outboard pipe, 14. For purposes of illustration only, the riser is shown mounted on a dock 22. Suitable piping (not shown) is provided between the riser and a liquid storage reservoir (also not shown). At the upper end of the riser 18, there is provided an elbow 24, which is mounted on the lower straight section by means of a swivel joint 26 which facilitates movement of the arm relative to the riser vertical axis. The triple swivel assembly comprises three swivels in mutually perpendicular planes and a series of adjacent elbows, to permit free movement of the arm. The overall configuration of the arm is essentially conventional and is illustrated in greater detail in the aforesaid U.S. Pat. No. 3,724,499. Other types of marine and fluid loading arms are contemplated for the present invention. In the loading arms previously discussed, as the fluid passes through the various elbows, the centrifugal force created will cause a pressure differential with the outer radius being at a higher pressure relative to the inner radius of the elbow. When the flow velocity is great enough, then the pressure level at the inner radius will fall below the known vapor pressure of the liquid and vapor bubbles will form. As the velocity increases, the degree of cavitation will also increase correspondingly. When the cavitation has developed sufficiently, it will extend into the straight sections of the downstream pipes, and it will end at a point downstream where there are no longer any centrifugal force effects in the pressure field and/or the fluid angular momentum will have dissipated. The formed vapor bubbles are then subjected to higher pressures and implosions or collapse of the bubbles occur, causing the problems previously discussed.

Figure 2:
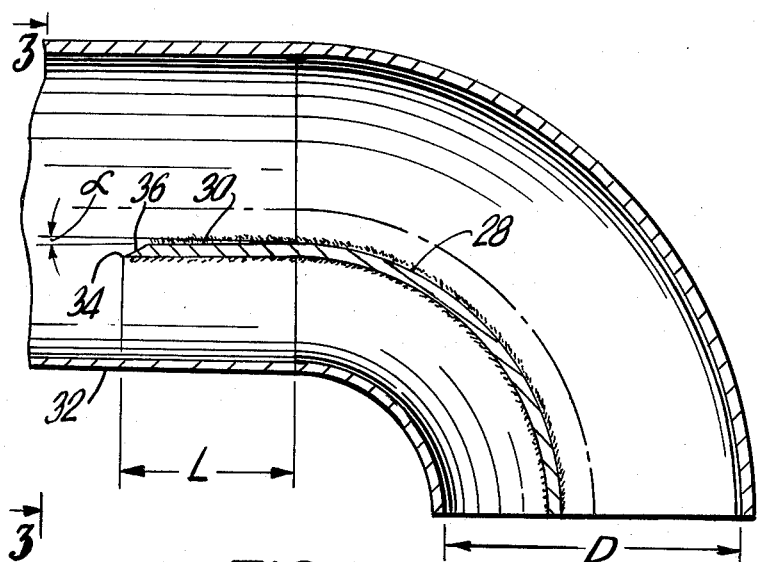
FIG. 2 is a cross-sectional view substantially along the pipe axis at an elbow incorporating a vane constructed and arranged according to the present invention.

To overcome these, there is provided in the pipe elbows turning vanes 28 according to the present invention which will suppress the occurrence of cavitation while improving the flow rate. These vanes are curved, rigid and made of metal or other light material and function to split the single flow stream into multiple streams which have smaller pressure gradients than the single flow stream pressure gradient. This permits higher flow rates to be achieved prior to reaching the fluid's vapor pressure, at which cavitation will result. According to the present invention, vanes are extended for a distance past the elbow tangent point which has been shown to improve the non-cavitating flow velocities. By lengthening the vane from about 0.4 to one times the elbow's inner diameter this accomplishes the desired objectives. Also, the extended vane was disposed at a slightly negative attack angle. By this it is meant that the extended portion of the vane is disposed at a negative angle relative to a plane parallel with the axis of the straight pipe section. Test results show that providing an approximate attack angle of $-1.5$ degrees and a vane extension of 0.4 to 1 times the elbow radius will prevent cavitation. However, it is anticipated and can be determined experimentally that the optimal negative attack angle $\alpha$ can vary, depending upon the product and elbow geometry employed. FIG. 2 illustrates the vane 28 extended at 30 for a distance L into the adjacent upstream section 32 of the pipe. The vane is situated on a line of constant bend radius which may be equal to approximately 0.85 times the elbow's internal diameter D. While the present embodiment is shown as employing a single vane, it is also contemplated that more than one vane may be employed, depending upon the amount of increase in flow velocity desired. The forward upstream or leading vane edge 34 is disposed transverse to the direction of flow through the arm and shaped with a sloping surface 36 away from the direction of flow in order to attain a relatively clean aerodynamic shape.

Figure 3:
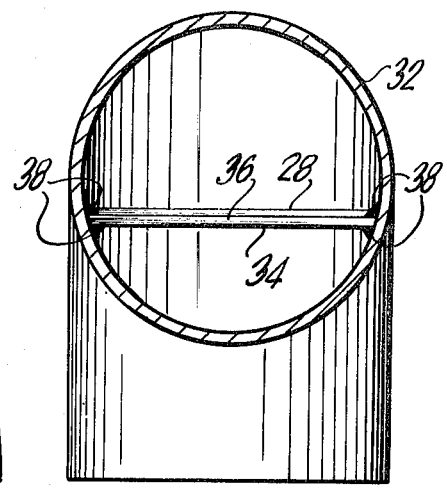
FIG. 3 is a cross-sectional view substantially along the line 3—3 of FIG. 2.

While a particular vane extension has been disclosed and described herein, the particular amount of extension of the vane upstream into the straight section can be optimized through standard testing in the laboratory and field. While shorter vane extensions may be possible in time the leading edges of the vanes may erode from the various local edge cavitation which can hasten more harmful elbow cavitation to occur. If it is desired to minimize the effects of the vane edge corrosion, then a longer extended vane can be utilized. In order to prevent the leading edge of the extended vane from fluttering, it is preferable to support the side edges of the vane as shown at 38 by means of welding (see FIG. 3) the vane on the upper and bottom sides to the inner wall of the loading arm pipe section.

Figure 4:
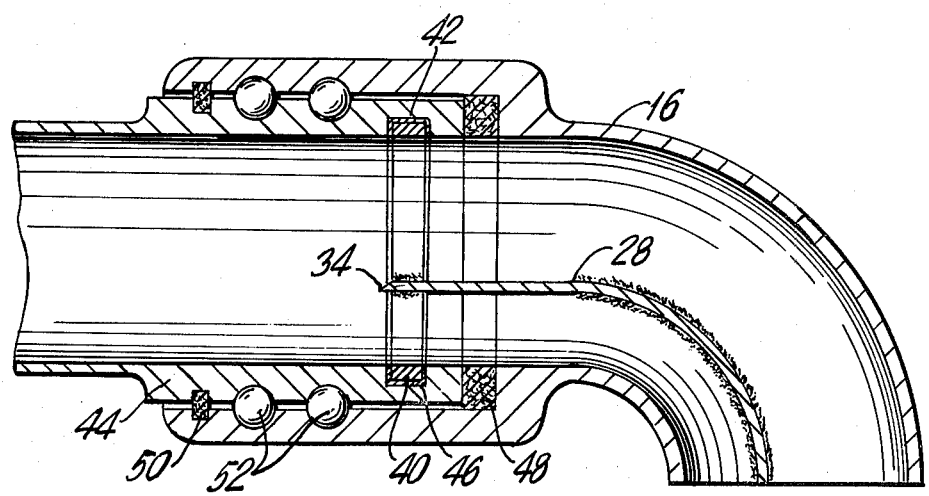
FIG. 4 is a cross-sectional view illustrating a vane constructed and arranged according to the present invention, which is mounted in a loading arm elbow adjacent to a swivel.

As shown in FIG. 4, when the elbow containing the vane 28 according to the present invention is located adjacent to a swivel, there is provided an annular support ring 40 which is rotatably mounted relative to a surrounding swivel portion. As shown, the support ring 40 rides in a recessed groove 42 formed in the rotatable nipple portion 44 of the swivel and between the outer surface of the ring and the groove surface is disposed a material 46 which has low friction and aids in forming relative sliding relationship between the surface of the swivel nipple and the support ring. This material may comprise Teflon or other materials which are compatible with the fluids' properties. In order to eliminate any flutter problems with the extended portion of the vane, the sides of the vane may be welded to the inner surface of the ring, which also aids in maintaining the vane at a constant negative attack angle relative to the direction of fluid flow. The extended side portions of the vane between the ring and the elbow tangent point is free, that is not welded. The swivel body is provided with suitable packing material 48, 50 for preventing leakage between the rotatable nipple and the main body relative movement of which is facilitated by means of the bearings 52.

Figure 5:
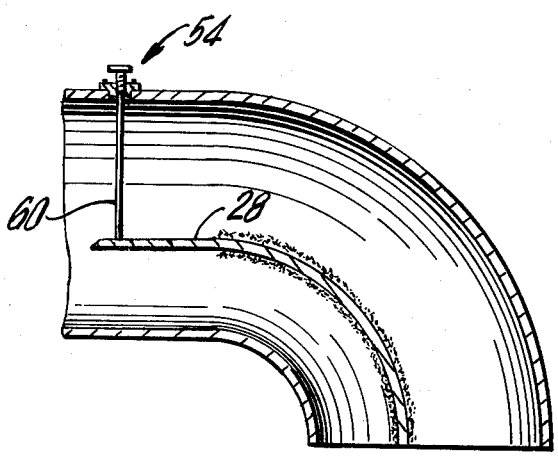
FIG. 5 illustrates a typical means for adjusting the attack angle of the vane according to the present invention.
Figure 6:
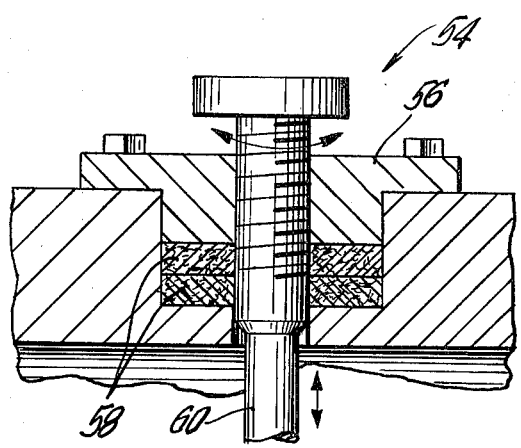
FIG. 6 illustrates in large partial cross-sectional view of the adjustment means employed in FIG. 5.

In order to obtain the preferred and optimum angle of attack, the extended portion of the vane may be made to coact with means for adjustably regulating the attack angle. This is shown in FIG. 5 by means of the screw-type adjustment member 54 which is mounted in the straight section of the pipe and extends through a seal unit in the pipe wall, perpendicular to flow direction and pipe longitudinal axis and in contact with the surface of the vane. By rotating the screw member which is threaded into support 56 secured to the pipe wall, as shown in FIG. 6 the stem rotates up or down depending on direction of rotation which causes the vane to move up or down, thus controlling the attack angle. The stem portion 60 itself, which extends through the pipe wall into contact with the vane can be aerodynamically shaped with an airfoil like configuration in order to avoid interference with the flow. The vane adjustment stem is packed with valve packing material 58 such as molded elastomeric or plastic rings, surrounding it in order to prevent leakage of the fluid flow from the pipe and mounted on top of the packing firmly to hold it in place is threaded support plug 56. The extended portion of the vane is not welded when employed with an adjustment mechanism for regulating and controlling the attack angle for obvious reasons. Also, the illustrated screw adjustment feature can be replaced by other means of a more sophisticated variety, such as a solenoid, hydraulically-operated pistons or motors for remote control at relatively inaccessible elbows in the arm, e.g., the elbows between the inboard pipe 12 and the outboard pipe 14 of FIG. 1.

Figure 7:
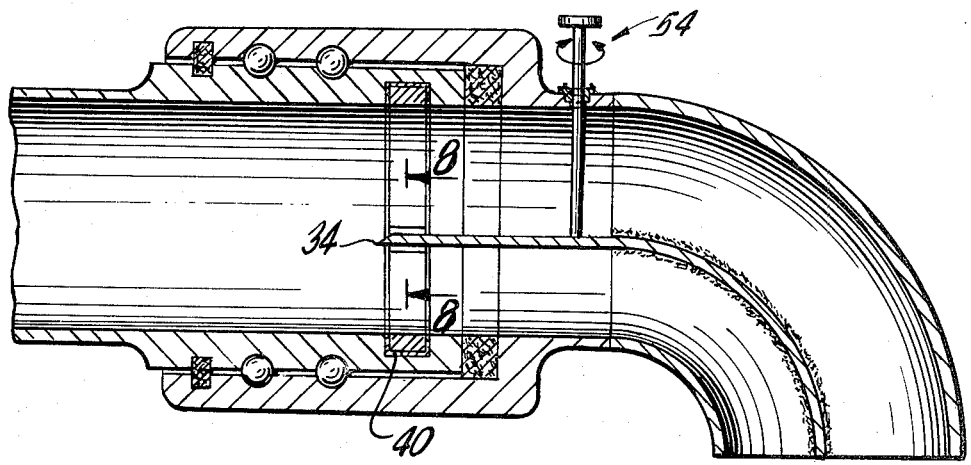
FIG. 7 illustrates a cross-sectional view of a vane according to the present invention mounted in an elbow adjacent to a swivel (like FIG. 4) and having means for regulating the vane attack angle.
Figure 8:
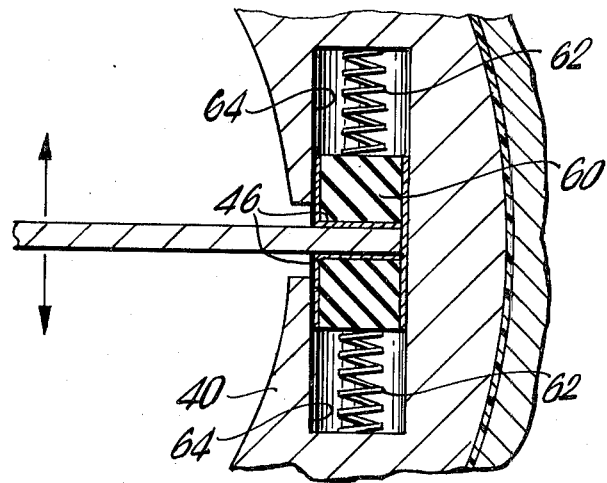
FIG. 8 illustrates an enlargement of a portion of FIG. 7 illustrating the vane mounted in a ring.

In the case of a vane which extends into a swivel, the same general type of adjustment feature as discussed above in connection with FIG. 5 can be used in combination with the support ring 40 as shown in FIG. 4. As illustrated, the support ring 40, as shown in FIG. 7, at and adjacent to the vane leading edge 34 captures the vane on either side thereof by means of bearing block 60 and packing 60 directly adjacent to each surface (upper and lower). On opposed upper and lower sides of the vane at its transverse end, there is also provided adjustment springs 62 which are disposed between the support ring 40 and the bearing block and packing 60. This is all mounted in the recess 64 formed in the support ring, and each bearing block 60 is coated with a material 46 such as Teflon to provide a sliding surface relative to the ring recess. As illustrated, the portion of the side edges of the vane between the support ring and the tangent point for the elbow are not welded and the adjustment mechanism is mounted directly proximate the elbow tangent point, although it can be mounted at other locations such as further upstream of the swivel. Adjustment of the threaded screw will cause a force up or down to be imposed on the extended vane thereby permitting the vane to move accordingly and thus adjust the attack angle. The springs 62 are stiff enough to prevent flutter during flow and thus, there is no need for welding as in the case of the other embodiment. The bearing members 60 act as not only bearing surfaces but also as a seal to prevent the springs from getting clogged with the fluid passing through the arms.

Figure 9:
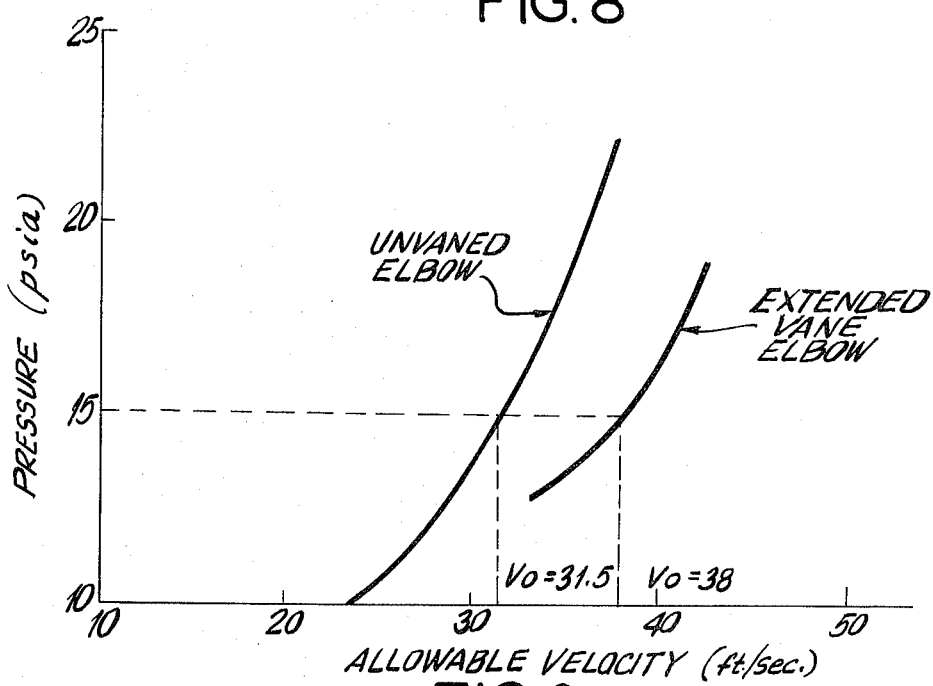
FIG. 9 illustrates typical test results obtained from vaned elbows according to the present invention.

The aforedescribed invention combining the extended vane and the negative vane attack angle has been shown to provide an effect which improves cavitation performance to a greater extent than when employed separately. The anticipated improvement in flow characteristics by providing vaned elbows did not materialize until the vane was in accordance with the present invention extended upstream of the elbow beyond the tangent point and at a negative attack angle. It was found that merely extending the vane alone would not produce the improved performance desired and in those instances would be no better than equivalent unvaned single elbow. Accordingly, it is felt that the combination of both the vane extension and the negative angle are essential features of the present invention. It is believed that with these features consistently superior flow performance will result in actual operation without increase in back pressure. FIG. 9 illustrates test results obtained from an extended vane of length equal to one pipe diameter and at a negative attack angle of 1.3°.

In those instances where more than a single elbow is present in the loading arm, the criteria employed in the tests was to vary the included angle between adjacent elbows. While only limited testing was done on vaned mulit-elbow geometries, the beneficial effects on safe flow velocity of vaning single elbows are expected. The features such as extending the vane and varying the attack angle would also apply for the elbows of the multi-elbow geometries.

Having thus set forth the present invention in its preferred embodiments, it will be apparent that various modification and variations may be made thereto without departing from the true spirit and scope of the subject invention.

What is claimed is:

1. A passage for flow of liquid therethrough comprising at least a curved pipe elbow section and an adjacent upstream straight pipe section adapted for receiving liquid flow in a direction from said straight section to said elbow section, at least a single curved vane mounted in said passage of said curved pipe elbow section at a predetermined constant radius, said vane having a main surface extending between the sides of said passage and extending lengthwise in a curved configuration corresponding to that of said curved pipe elbow section beyond the end of said curved pipe elbow section into said straight pipe section for a predetermined distance and having a leading edge which has an aerodynamic configuration that will not interfere with liquid flow, only said extended portion of said vane main surface being disposed at a negative angle relative to the direction of flow of said liquid through said straight pipe section, whereby the combination of said extended vane and said negative angle of said vane substantially suppresses cavitation of the liquid flowing through said passage without increasing the back pressure in said passage.

2. The passage according to claim 1 including means for adjusting said negative angle of said main surface of said vane.

3. The passage according to claim 1 wherein said vane extends upstream from about 0.4 times the inside diameter of said pipe elbow section to about one times the inside diameter of said pipe elbow section.

4. The passage of claim 1 wherein said leading edge is disposed transversely of the direction of liquid flow and includes a sloping surface facing the direction from which said liquid flows.

5. The passage according to claim 4 wherein said vane includes side edges extending in the direction of liquid flow which are supported against any substantial fluttering.

6. The passage according to claim 4 wherein said vane includes side edges extending in the direction of liquid flow which are welded at least partially adjacent the leading edge thereof to said straight pipe section.

7. The passage according to claim 2 wherein said adjustment means comprises a threaded screw-type member for controlling said negative angle of said vane.

8. The passage of claim 1 wherein said passage comprises a loading arm.

9. A passage for flow of liquid therethrough comprising at least a curved pipe elbow section and an adjacent upstream straight pipe section adapted for receiving liquid flow in a direction from said straight section to said elbow section, at least a single curved vane mounted in said passage of said curved pipe elbow section, said vane extending lengthwise in a curved configuration corresponding to that of said curved pipe elbow section beyond the end of said curved pipe elbow section into said straight pipe section for a predetermined distance, said pipe elbow section comprising a swivel body and including a ring mounted for rotation relative to said swivel body and supporting the leading extended portion of said vane, said extended portion of said vane being disposed at a negative angle relative to the direction of flow of said liquid through said pipe section, whereby the combination of said extended vane and said negative angle of said vane substantially suppresses cavitation of the liquid flowing through said passage without increasing the back pressure.

10. The passage according to claims 9 including means for resiliently supporting the forward portion of said extended vane while preventing fluttering thereof during flow of liquid through said passage in combination with means for adjustably controlling the negative angle of said vane.

* * * * *